Figure 1:
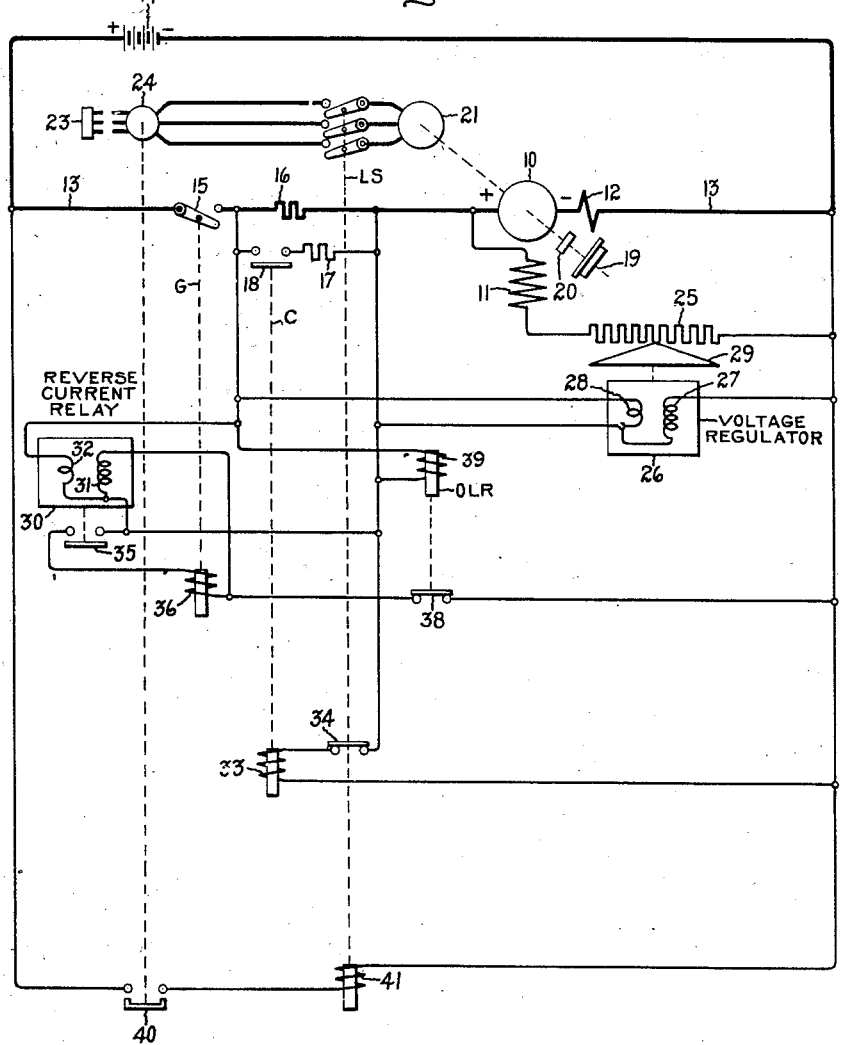

March 27, 1945.　　　O. A. KEEP　　　2,372,498
CONTROL SYSTEM
Filed May 6, 1942　　　2 Sheets-Sheet 1

Inventor:
Otto A. Keep,
by Harry E. Dunham
His Attorney.

March 27, 1945.  O. A. KEEP  2,372,498
CONTROL SYSTEM
Filed May 6, 1942  2 Sheets-Sheet 2

Inventor:
Otto A. Keep,
by Harry E. Dunham
His Attorney.

Patented Mar. 27, 1945

2,372,498

UNITED STATES PATENT OFFICE 2,372,498

CONTROL SYSTEM

Otto A. Keep, Harborcreek, Pa., assignor to General Electric Company, a corporation of New York Application May 6, 1942, Serial No. 441,909

2 Claims. (Cl. 175—335)

My invention relates to electric control systems for electric power circuits such as traction motor circuits and the like, and has particular reference to new and improved means for accurately maintaining the calibration of current responsive control elements or instruments independently of the magnitude and manner of variation of the current in the power circuit.

In electric control systems, current responsive relay coils and the like are commonly connected in parallel circuit relation with a current shunt, so that the relay or instrument coil does not carry the total current flowing in the power circuit. In this way the total power circuit current is divided in a predetermined proportion between the shunt and the coil, and the coil is calibrated to actuate a control element in response to some current which bears a proportional relation to and is indicative of a predetermined total power circuit current. Where such an arrangement is used, difficulty is frequently experienced in that the calibration of the current responsive coil is found to change in dependence upon the magnitude and previous mode of variation of the total load current in the power circuit. Such variations in the calibration of current coils are due to disproportionate changes in the resistance of the coil with respect to its shunt under changing load conditions. The error in calibration may be directly proportional to the load on the power circuit as, for example, between no load and full load, or, if the coil and shunt resistances are arranged to maintain a predetermined directly proportionate relation as they change in accordance with load current, there may still exist a transient error in calibration arising from differences in the manner of rise or fall of temperature of the elements under changing load conditions.

Accordingly, it is an object of my invention to provide, in an electric power circuit, means for accurately maintaining the calibration of shunt-connected current responsive control coils independently of the magnitude and previous manner of variation of the current in the power circuit.

It is a further object of my invengtion to provide, in an electric power circuit, means for rendering the calibration of a shunt-connected current responsive control coil independent of changing current in the power circuit and the consequent rate of absorption or dissipation of heat by the shunt and the coil.

The invention is particularly applicable to battery charging electric generating systems for electric traction vehicles such as railway locomotives, cars, and the like. Such systems are subject to constantly varying loads as vehicle speed and charging rate change, and therefore necessitate substantially complete compensation for errors of the type described above. Such battery charging generating systems frequently serve as sources of supply for car air conditioning and lighting systems and the like, and in order to derive the energy therefor from the vehicle driving engine, the generator is usually driven by a live axle of the car. Such systems have also been provided with a low power alterating current motor mounted upon the vehicle and arranged alternatively to drive the generator when the vehicle is at rest and the motor is connected to an external source of alternating current supply, such as the yard power. As a result of the small capacity of existing yard power systems, an auxiliary driving motor of this type is preferably of small size and means are provided for reducing the current-limit of the battery charging circuit during operation from yard power. My invention is particularly applicable to a system of this latter type because of the constant variations in the magnitude of battery charging current not only because of variable vehicle speed and variable conditions of charge of the battery but also because of change in the standard of regulation when the system is operated from yard power.

Figure 2:
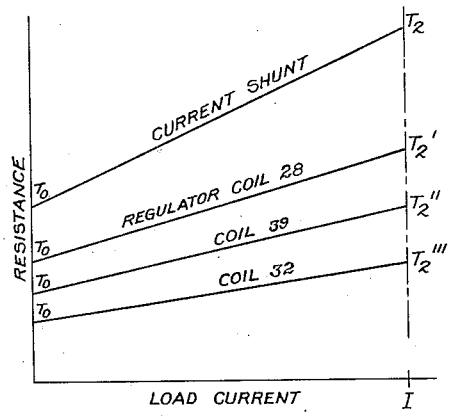
Figure 3:
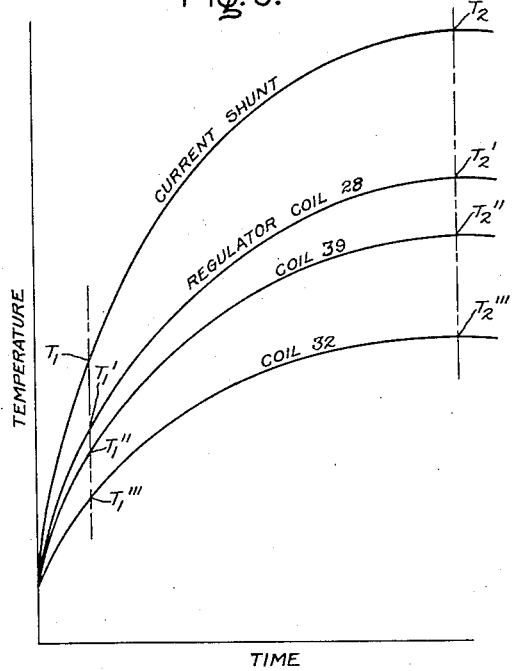
Figure 4:
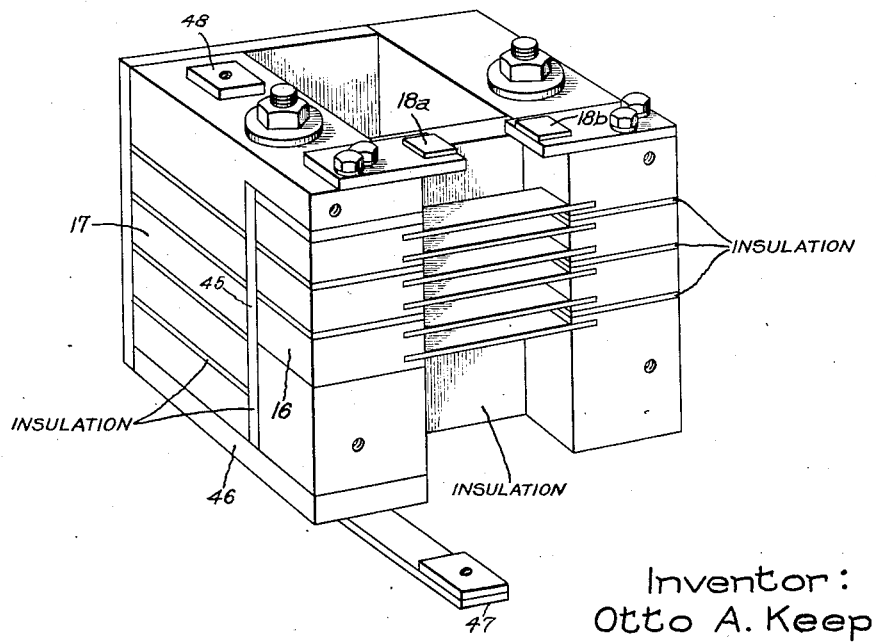

My invention will be better understood and its objects and advantages further appreciated by referring now to the following detailed specification taken in conjunction with the accompanying drawings in which Fig. 1 is a schematic circuit diagram of a railway vehicle battery charging generating system including a current shunt and control circuit embodying my invention; Fig. 2 is a graphical representation of the resistance variations in the current shunt and parallel connected control relay coils with changes in load upon the generator; Fig. 3 is a graphical representation of temperature rises in the current shunt and parallel connected control relay coils with time after the establishment of a predetermined load current; Fig. 4 is a perspective view of one form of current shunt suitable for use in connection with my invention.

Referring now to Fig. 1, I have illustrated a railway vehicle battery charging generating system comprising a direct current generator 10 having a shunt field winding 11 and a commutating field winding 12 and connected by means of power or load circuit conductors 13 to a battery 14 through the main switch 15 of a generator line contactor G. The load circuit of the generator includes a plurality of shunts 16 and 17, one of which is arranged to be disconnected from the power circuit by the switch contact 18 of a shunt contactor C. The generator 10 is normally driven from a live axle 19 of a vehicle through a suitable clutch 20, and may alternatively be driven by a small alternating current motor 21. The motor 21 is mounted upon the vehicle and permanently connected to the drive shaft of the generator 10, though it will of course be understood that if desired a suitable manual or automatic clutch may be interposed between the generator and the motor 21. The alternating current motor 21 may be connected to a source of alternating current supply, such as a yard power circuit 23, through a control plug 24 and the switch contacts of an alternating current line switch LS.

A variable field resistor 25 is connected in series circuit relation with the shunt field winding 11 for controlling the energization of the field winding normally to maintain the generator voltage substantially constant as the vehicle speed varies. The resistance of the resistor 32 is varied by a regulator 26, preferably of the type described and claimed in Patent 2,064,621 issued to J. W. McNairy on December 15, 1936. Such a regulating relay comprises a voltage responsive winding 27, a current limit winding 28, and a resistor short circuiting bar 29. As explained in the aforementioned McNairy patent, the current winding 28 has no effect upon the operation of the regulator until a predetermined maximum current in the load circuit is attained. Thereafter the winding 28 operates to limit the load current to such predetermined value.

The control system is also provided with a reverse current relay 30 which is preferably though not necessarily of the type described and claimed in Patent 2,275,837, issued to G. Bellows, Jr. on March 10, 1942. This relay comprises a potential coil 31 and a series or current coil 32, and functions to permit energization of contactor G when the generator potential is of the proper direction and magnitude for charging the battery and to disable the contactor G upon the flow of reverse current from the battery to the generator.

With the above understanding of the principal elements of the control system, the operation of the system as a whole and the arrangement and functions of the various other elements of the system will be best understood from the following detailed description of the operation. Let it first be assumed that the generator 10 is driven from the live axle 19 of the vehicle and that the various relays and contactors are in their de-energized positions as shown at Fig. 1.

The generator voltage builds up as the car speed increases. When the voltage attains any desired value slightly below normal voltage, the shunt contactor C picks up to close the shunt contact 18. An actuating coil 33 for the contactor C is energized directly across the terminals of the generator 10 through a normally closed interlock contact 34 on the alternating current line switch LS. As soon as the generator voltage is slightly above the battery voltage, the reverse current relay 30 closes a contact 35 and completes an energizing circuit for an actuating coil 36 of the generator line contactor G. This energizing circuit may be traced from the positive terminal of the generator 10 through the contact 35 of reverse current relay 30, the actuating coil 36, and a normally closed interlock contact 38 of an overload relay OLR to the negative terminal of the generator 10. Actuation of the generator line contactor closes the switch contact 15 and completes a charging circuit for the battery 14. The overload relay OLR includes a series or current responsive winding 39.

With the car operating within its normal speed range and the battery charging, the regulator 26 controls the resistance of the field resistor 25 in such a manner as to normally maintain substantially constant the generator voltage. The operation of this relay will be evident from a study of the aforementioned McNairy patent.

For operation of the generating system from yard power when the car is laid up, the clutch 20 is disengaged to disconnect the generator from the car axle 19. It will of course be understood that the clutch 20 may be either manually or automatically operated. Preferably it is biased to an engaged position and automatically disengaged upon energization of the motor 21 by any desired conventional interlocking arrangement. As previously mentioned, the motor 21 is preferably of relatively small capacity in order to avoid overloading the yard power system. For this reason it is desirable to alter the standard of regulation of the regulator 26 by reducing the maximum current limit. This is done by disabling the current shunt 17 upon actuation of the alternating current line switch LS.

Operation of the system from the yard power is initiated as follows: When the plug connector 24 is connected to the power source 23, an interlock contact 40 is closed to complete an energizing circuit for an actuating coil 41 of the alternating current line switch LS. When the line switch LS is picked up, it opens its normally closed interlock contact 34 to disable the actuating coil 33 of the shunt contactor C. Open circuiting of the actuating coil 33 insures that the switch contact 18 will remain open thereby to disable the current shunt 17. In all other respects operation of the system from yard power is the same as that described above in connection with operation from the live axle 19 of the vehicle.

It may now be noted that in the control system disclosed, three relay coils are connected in parallel circuit relation with the current shunts 16 and 17. These are the current coil 28 of the regulating relay 26, the overload coil 39 of the overload relay OLR, and the series coil 32 of the reverse current relay 30. Since the total current in the load circuit divides in predetermined proportions between the current shunts 16 and 17 and the relay coils 28, 39, and 32, it will be evident that in order to maintain the current limit setting of the relay 26 at its desired value, the predetermined proportionate distribution of current through these parallel connected circuits must be maintained at all times regardless of the temperature of the various coils and shunts due to the magnitude of currents passing therethrough and the load cycle through which the circuit has just passed.

Considering, by way of example, only the current limit coil 28 of the relay 26 and one of the current shunts, it will be evident that if the resistances of the shunt and the coil change disproportionately between cold and hot running conditions, as for example between very light load and full load, and if the resistances are properly proportioned to give the desired current-limit value when cold, the coil 28 will carry either more or less than its proper proportion of current when hot, so that the current limit will be changed. For example, if the resistance of the coil 28 increases by a lesser proportion than the increase in resistance of the current shunt, the coil will be overexcited when hot, so that the current-limit value will be lowered. This difficulty may be overcome by selecting for the coil 28 and the current shunt, materials having such temperature coefficients of resistance that their relative changes in resistance from cold to hot are the same, that is, the resistances of the shunt and the coil are linearly related at all times independently of temperature changes of the parts arising from changes in load current. Even this, however, is not sufficient to maintain the calibration of the current coil 28 constant under all conditions, for if the temperatures of the coil 28 and the current shunt are not linearly related at all times as they change from initial to final temperatures under changing load conditions, there will be introduced a transient change in the current-limit value.

Thus it will be evident that in order to maintain the calibration of the current coil 28 at all loads, it is necessary that a linear relation exist between the resistance of the coil 28 and the resistance of the parallel-connected current shunt independently of the value of the generator load current. Similarly, to avoid transient displacements of the current-limit value under changing load conditions, a linear relation must also exist between the temperature of the various parts during a period of change due to changes in load current. It will also be evident that the same conditions must be met with respect to the resistances of any other current responsive coils which are connected in parallel circuit relation with the current shunt or shunts, such as the coils 39 and 32.

The first of these conditions is graphically illustrated at Fig. 2 which is a group of curves representing the resistances of the various parallel-connected elements plotted against load current as their temperatures change due to changes of load current. In plotting the curves of Fig. 2 it has been assumed that at time O all the coils and the shunt are at ambient temperature $T_0$, while with a load current of I upon the system the steady state temperatures of the shunt, the regulating coil 72, the coil 39, and the coil 32 are $T_2$, $T_{2'}$, $T_{2''}$, and $T_{2'''}$, respectively. This general condition must be assumed, since it is evident that the temperature of any coil or shunt under any load condition other than no load is not necessarily the same as the temperature of any other coil, but depends upon the magnitude of current carried by the particular coil, the resistance of the coil, and upon the ambient temperature. Considering again only the current shunt and the regulating coil 28, it will be evident that the resistance of the current shunt at any temperature such as $T_2$ will be determined by the temperature coefficient of resistance of the shunt according to the equation:

(1) $\quad R_s T_2 = R_s T_0 [1 + \alpha_s (T_2 - T_0)]$ where $R_s$ is the resistance of the current shunt and $\alpha_s$ is the temperature coefficient of resistance of the shunt. Similarly, the resistance of the current limit coil 28 at a temperature $T_{2'}$ is determined by the Equation 2:

(2) $\quad R_c T_{2'} = R_c T_0 [1 + \alpha_c (T_2 - T_0)]$ where $R_c$ is the resistance of the coil 28 and $\alpha_c$ is the temperature coefficient of resistance of the coil. As previously stated, the necessary relation of the resistance $R_s$ and the resistance $R_c$ at any temperature is linear as determined by the Equation 3:

(3) $\quad \dfrac{R_s T_x}{R_c T_x} = K_1$ where $K_1$ is any constant.

The thermal capacity of a body is defined as the amount of heat absorbed by the body per unit increase in its temperature with no change of state and no transfer of heat from the body to other bodies. Thus, calling the thermal capacity of the shunt $C_s$ and the thermal capacity of the coil 28, $C_c$, the temperature differences $T_2 - T_0$ and $T_{2'} - T_0$ may be expressed as follows:

(4) $\quad T_2 - T_0 = \dfrac{H_{sa} - H_{sd}}{C_s} = \dfrac{\text{net heat added to shunt}}{C_s}$ (5) $\quad T_{2'} - T_0 = \dfrac{H_{ca} - H_{cd}}{C_c} = \dfrac{\text{net heat added to coil}}{C_c}$ where $H_{sa}$ is the heat added to the shunt by the increased $I^2R$ losses and $H_{sd}$ is the heat dissipated from the shunt during the same period, while $H_{ca}$ is the heat added to the coil 28 by the increased $I^2R$ losses and $H_{cd}$ is the heat dissipated from the coil 28 during the same period. The values of $H_{sd}$ and $H_{cd}$ depend upon the heat dissipating capacities of the shunt and coil respectively and upon the ambient temperature, and may be controlled by providing more or less heat dissipating surface. As indicated at Equations 4 and 5, the amount of heat added less the amount of heat dissipated in each case may be expressed as the net amount of heat added.

From the above equations it will be evident that (6) $\quad \dfrac{R_s T_0 \left[1 + \alpha_s \dfrac{(\text{net heat added to shunt})}{C_s}\right]}{R_c T_0 \left[1 + \alpha_c \dfrac{(\text{net heat added to coil})}{C_c}\right]} = K_1$ and since $$\dfrac{R_s}{R_c} = K_1$$

it follows that (7) $\quad \alpha_s C_c (\text{net heat added to shunt}) = \alpha_c C_s (\text{net heat added to coil})$ In order to maintain the calibration of the coil 28 under transient conditions, that is, before the shunt and coil have arrived at their final temperatures after a change in load current, it is also necessary that temperatures of the shunt and coil maintain a substantially linear relation during the period of temperature change regardless of the rate of change of load current. Such a relation is shown at Fig. 3 where the temperatures of the shunt and current responsive coils are plotted against time as they rise from the ambient $T_1$ to their respective final temperatures $T_2$, $T_{2'}$, $T_{2''}$ and $T_{2'''}$ upon the sudden imposition of the load I of Fig. 2. The relation may be represented by the equation:

(8) $\quad \dfrac{T_2}{T_{2'}} = \dfrac{T_1}{T_{1'}} = K_2$ where $K_2$ is a constant. Then, from Equations 4, 5, and 8 it is evident that (9) $\quad T_1 C_c (\text{net heat added to coil} + C_c T_{1'}) = T_{1'} C_c (\text{net heat added to shunt} + C_s T_1)$ and

(10) $\quad \dfrac{T_1}{T_{1'}} = \dfrac{C_s (\text{net heat added to coil})}{C_c (\text{net heat added to shunt})} = K_2$ so that

(11) $\quad C_s (\text{net heat added to coil}) = K_2 C_c (\text{net heat added to shunt})$ From Equations 1, 2, 3, and 8 it will be evident that when the temperatures $T_2$ and $T_{2'}$ are equal, the temperatures $T_1$ and $T_{1'}$ are equal, $K_2=1$, and the temperature coefficients of resistance $\alpha_s$ and $\alpha_c$ must be equal. In such a case, Equations 7 and 11 indicate that all the desired conditions of resistance variation may be attained by providing that the product of the thermal capacity of the coil and the net amount of heat added to the shunt shall equal the product of the thermal capacity of the shunt and the net amount of heat added to the coil. Since ordinarily all parts are designed to operate at maximum permissible temperature limits, and since these temperature limits ordinarily do not differ substantially, the relation will ordinarily satisfy the conditions. While the relations of Equations 7 and 11 will not be fully satisfied where $T_2$ does not equal $T_{2'}$, they will be substantially met, since the products of thermal capacity and net heat added are the dominating factors. It will be understood that for substantial satisfaction of the above conditions it is not necessary that the temperature coefficients of resistance of the shunt and coil be exactly equal, but it is necessary that they be similar in nature; that is, the temperature coefficients must be both positive or both negative so that the resistance of the shunt changes in the same sense as the resistance of the coil for like temperature changes of the shunt and the coil.

Since the floating shunt coil 28 is ordinarily closely wound of a plurality of layers of turns of relatively fine wire, and since it is positioned in intimate heat conducting relation to other parts of the regulator, the effective thermal capacity of the coil is large relative to its heat dissipating capacity. Ordinarily, it has been found in actual practice that the requirements of Equations 7 and 11 are satisfactorily met by providing a current shunt having a substantial mass and a relatively small heat dissipating surface in relation to its mass. That is, the ratios of thermal to heat dissipating capacity for both coil and shunt are preferably approximately equal or of the same general order of magnitude. Such a shunt is illustrated at Fig. 4. The shunt illustrated at Fig. 4 comprises the two current shunts 16 and 17 built into a unitary structure. Each shunt comprises a plurality of massive end blocks of electrically conducting material such as copper which are connected together in series circuit relation by means of interconnecting straps of copper or the like material. As shown in Fig. 4, the current shunts 16 and 17 may be built as a single unit and divided by suitable insulation 45. The shunts are permanently connected together at one end by a conductor 46 and may be interconnected at the other end by the bridging contact 18 (Fig. 1) which engages the contact surfaces 18a, 18b of Fig. 4. The shunt 16 is fitted with line terminals 47 and 48.

It will now be evident that I have provided a control system including a plurality of current responsive control elements connected in parallel circuit relation with a current carrying shunt in power circuit in which the calibration of the current responsive relay elements is maintained correct at all times independently of the magnitude of current flowing in the load circuit and of the previous load cycle through which the load circuit has passed. Such maintenance of the calibration is effected by balancing the large thermal capacity and low heat dissipating capacity of the relay coil against a current shunt having a similar temperature coefficient of resistance and similar thermal characteristics. In this manner displacement of the calibration in proportion to the load current and transient error in the calibration due to different heating and cooling characteristics of the coils and shunt are both avoided.

While I have illustrated one embodiment of my invention by way of illustration, many modifications will occur to those skilled in the art, and I, therefore, wish to have it understood that I intend by the appended claims to cover all such modifications as fall within the true spirit and scope of my invention.

What I claim as new and desire to secure by Letters Patent of the United States, is:

1. A control system comprising an electric circuit arranged to carry a current subject to steady state and transient variations, control means for said circuit including an electro-responsive device having an actuating winding connected in series circuit relation with said electric circuit for response in accordance with said current, said winding being formed to provide a high ratio of effective thermal capacity to heat dissipating capacity, and a current shunt connected in parallel circuit relation with said winding and comprising a plurality of massive blocks of electric conducting material connected in series circuit relation by conductors of relatively small cross section to provide a correspondingly high ratio of thermal capacity to heat dissipating capacity, the temperature coefficient of resistance of said shunt being such that its resistance changes in the same sense as the resistance of said winding with like changes in temperature of said shunt and winding, whereby a substantially constant proportionate division of current is maintained between said shunt and winding irrespective of the magnitude and rate of change of current in said electric circuit.

2. A control system comprising an electric circuit arranged to carry a current subject to steady state and transient variations, an electric translating device including an electro-responsive winding connected in series circuit relation with said electric circuit for response in accordance with said current, said winding being formed to provide a high ratio of thermal capacity to heat dissipating capacity, and a current shunt connected in parallel circuit relation with said winding and having a temperature coefficient of resistance such that the resistance of said shunt changes in the same sense as that of said winding with like changes of temperature of said shunt and winding, said shunt being formed of a plurality of massive blocks of conducting material separated by spacers of insulating material to provide substantial thermal storage capacity and connected together in series circuit relation by resistance conductors of relatively small cross section to provide a desired voltage drop across said shunt, whereby a substantially constant proportionate division of current is maintained between said shunt and said winding irrespective of the magnitude and rate of change of current in said electric circuit.

OTTO A. KEEP.